Figures 1, 2:
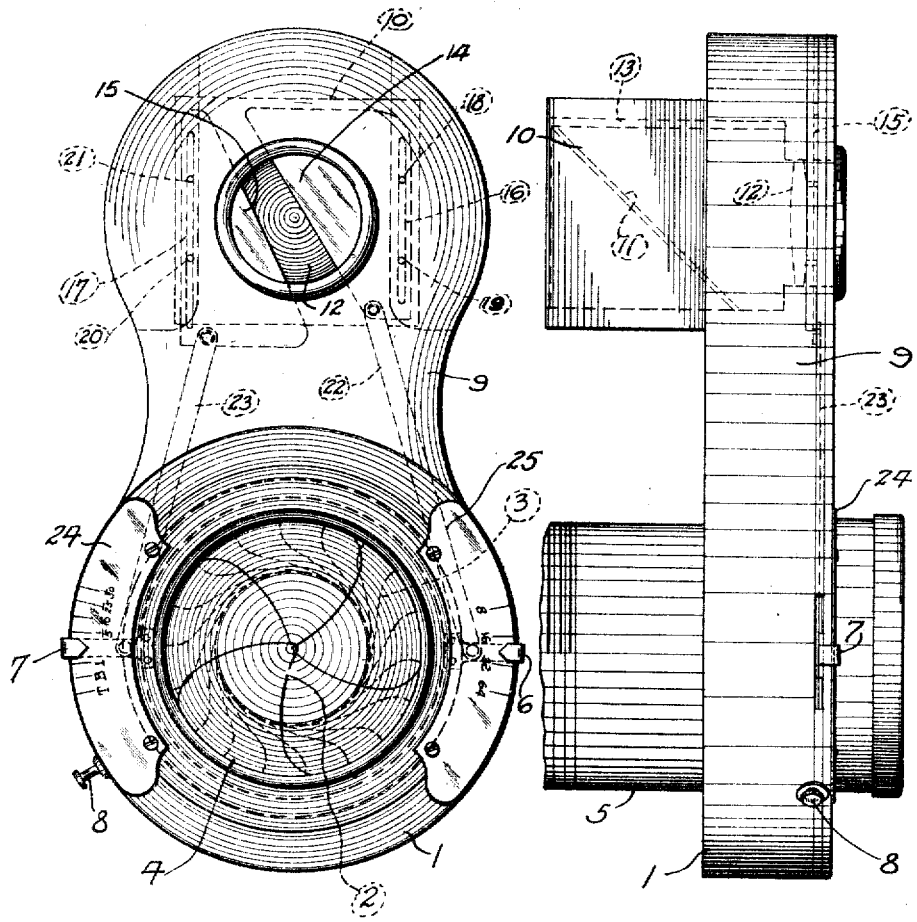

H. G. AYLSWORTH.
PHOTOMETER.
APPLICATION FILED AUG. 1, 1916.

1,290,695.

Patented Jan. 7, 1919.

INVENTOR.
HOWARD G. AYLSWORTH
BY Carlos P Griffin
ATTORNEY.

UNITED STATES PATENT OFFICE.

HOWARD G. AYLSWORTH, OF SAN FRANCISCO, CALIFORNIA, ASSIGNOR OF ONE-THIRD TO GEORGE A. DOLAN AND ONE-THIRD TO WILLIAM WOLF, BOTH OF SAN FRANCISCO, CALIFORNIA.

PHOTOMETER.

1,290,695.

Specification of Letters Patent.

Patented Jan. 7, 1919.

Application filed August 1, 1916. Serial No. 112,525.

*To all whom it may concern:*

Be it known that I, HOWARD G. AYLSWORTH, a citizen of the United States, residing at San Francisco, in the county of San Francisco, State of California, have invented a new and useful Photometer, of which the following is a specification in such full and clear terms as will enable those skilled in the art to construct and use the same.

This invention relates to a photometer adapted to be applied to the shutter and diaphragm of a photographic lens to enable the user to accurately determine the time required for an exposure with any given stop or the stop to use for any given time, the device being applied to the finder used for positioning the camera and having means connected therewith for determining the stop to use as well as the time of exposure.

It will be understood by those skilled in the art that in taking pictures with a plate of a given speed there are two variable factors, one, the time of exposure, and the other the size stop used, so that any means for determining both of these factors must take account of both of them.

In the present invention the illumination of the screen in the finder is made use of to determine the time and stop to use in making the exposure.

An embodiment of the invention is shown in the drawing in which the same reference numeral is applied to the same portion throughout, but I am aware that there may be many modifications thereof.

Figure 1 is a front elevation of a lens tube having a common form of iris diaphragm and iris shutter, and Fig. 2 is a side elevation of the lens tube and finder shown in Fig. 1.

The numeral 1 indicates the casing within which the operating mechanism for the shutter leaves 2 and iris diaphragm 3 are mounted, said shutter and diaphragm being of a construction well known in the art. The lens 4 is applied to the front of the shutter casing and the tube 5 to the back thereof to connect the lens with the body of the camera.

The iris diaphragm is operated in a well known manner by means of a lever having a pointer 6, while the shutter is set as to time by shifting a lever having a pointer 7, the shutter being set off by pushing on a pin 8, all of the foregoing construction being well known in the art and forming no part of the present invention.

Connected with the casing carrying the operating mechanism for the shutter and diaphragm is a secondary casing 9 which carries a finder box 10 having a reflector 11, lens 12 and ground glass 13, upon which the image made by the finder lens is observed. In front of the finder lens there are two slidable plates 14, 15, said plates being cut at an angle with respect to their slots 16, 17 along which they slide, pins, 18, 19, 20 and 21 determining their path of travel.

The slidable plate 14 is pivotally connected with a link 22, which link is in turn connected to the arm carrying the pointer 6, while the plate 15 has a link 23 pivotally connected therewith and pivotally connected with the arm carrying the pointer 7.

Secured on the outside of the shutter casing are two plates 24, 25 which plates are graduated in a manner well known to photographers to indicate the size of the stop intended to be used, the pointers being movable across said graduations to indicate the point at which the diaphragm and shutter respectively will operate in the way intended.

The operation of the device is as follows: In the first place it is to be observed that the brighter the light the shorter the exposure can be and the smaller the aperture can be, while the duller the light the slower will be the exposure and the larger must be the aperture, or, if a given aperture is desired or a given time desired, as for example, when a person desires to take a snap shot it is known in advance that an exposure must be made in 1/25 of a second or less to prevent the picture from being blurred, the stop must then be changed to give the necessary light.

In the present instance, the finder will be examined until a desired illumination of its screen 13 is had, which illumination will be determined by the holder of the apparatus and this illumination is obtained by increasing or diminishing the quantity of light that is allowed to pass through the lens 12 by raising or lowering either of the plates 14 or 15. When the desired illumination of the screen 13 is had the exposure will be made in accordance with the indications of the pointers 6 and 7.

It is to be observed that with properly shaped lenses for the finder the style of opening through which they receive light from the objects to be photographed matters little, the only difference being that as the lens is covered or uncovered more or less light will be delivered to the screen upon which the image is seen.

Having thus described my invention what I claim as new and desire to secure by Letters Patent of the United States, is as follows, express reservation being made of permissible modifications:

1. A photo meter comprising a view finder having a lens, an opaque slide movable across the finder lens, means to move the slide to gradually obscure or uncover the finder lens, a camera having a lens, a shutter for the camera lens, means to regulate the timing of the shutter, and a link connecting the slide and the said shutter regulating apparatus whereby the finder lens will be more obscured as the shutter time is decreased and less obscured as the shutter time is increased.

2. A photo meter comprising a view finder having a lens, an opaque slide movable across the lens of the finder, means to move the slide to gradually obscure or uncover the finder lens, a camera having a lens, a diaphragm for the camera lens, means to increase or diminish the opening in the camera diaphragm, and a link connection between the diaphragm operating lever and the opaque slide whereby the finder lens will be more obscured as the opening in the diaphragm is diminished and less obscured as the opening in the diaphragm is increased.

3. A photo meter comprising a view finder having a lens, a pair of opaque slides movable across the finder lens to obscure or uncover it, a camera having a lens, a shutter for the camera lens, means to regulate the timing of the shutter, a link between the shutter timing mechanism and one of the finder slides, whereby the finder lens will be more obscured as the shutter time is decreased and less obscured as the shutter time is increased, a diaphragm for the camera lens having an opening, means whereby the opening in the diaphragm may be increased or diminished in size, and a connection between the diaphragm adjusting mechanism and one of the slides for the finder whereby as the diaphragm opening is increased the finder lens will be more uncovered and vice versa.

In testimony whereof I have hereunto set my hand this 27th day of July, A. D. 1916.

HOWARD G. AYLSWORTH.